United States Patent [19]

Mashimo et al.

[11] Patent Number: 4,468,934
[45] Date of Patent: Sep. 4, 1984

[54] ABSORPTION REFRIGERATION SYSTEM

[75] Inventors: Katsuyuki Mashimo, Ota; Teruo Masuda, Chiyoda; Toshio Nakayama, Omama; Masuyuki Hashimoto, Ojima; Takeshi Kanai, Oizumi, all of Japan

[73] Assignees: Sanyo Electric Co., Ltd.; Tokyo Sanyo Electric Co., Ltd., both of Osaka, Japan

[21] Appl. No.: 449,213

[22] Filed: Dec. 13, 1982

[30] Foreign Application Priority Data

Dec. 16, 1981 [JP] Japan .................................. 56-203946
May 7, 1982 [JP] Japan .................................. 57-76427
May 7, 1982 [JP] Japan .................................. 57-66154[U]

[51] Int. Cl.³ .............................................. F25B 33/00
[52] U.S. Cl. ......................................... 62/495; 62/476
[58] Field of Search ................................... 62/476, 495

[56] References Cited

U.S. PATENT DOCUMENTS

| 364,198 | 5/1887 | Wren | 62/495 |
| 925,625 | 6/1909 | Day | 62/495 |
| 1,693,553 | 11/1928 | Munters | 62/495 X |
| 1,818,433 | 8/1931 | Ryden | 62/495 X |
| 1,960,809 | 5/1934 | Dahlgren | 62/495 X |
| 2,042,355 | 5/1936 | Munters | 62/495 X |
| 2,237,302 | 4/1941 | Flukes | 62/495 X |
| 3,038,321 | 6/1962 | Merrick | 62/495 |
| 4,127,993 | 12/1978 | Phillips | 62/476 X |
| 4,291,545 | 9/1981 | Worsham | 62/476 X |

Primary Examiner—Lloyd L. King
Attorney, Agent, or Firm—Hubbell, Cohen, Stiefel & Gross

[57] ABSTRACT

An absorption refrigeration system having a generator, a rectifier, a condenser, an evaporator, an absorber and heat exchangers which are connected by means of conduits in an airtight manner so that circulations for refrigerant and for absorbent solution are formed, wherein the rectifier is mounted upright above the generator, and wherein a receiver for receiving absorbent containing refrigerant is mounted below the rectifier and communicates with the lower portion of the generator through an absorbent passage means, whereby decreasing hindrance of the generation of the refrigerant vapor from the generator, thus increasing the efficiency in generating vapor and, at the same time, preventing local overheating of the solution in the generator.

13 Claims, 10 Drawing Figures

ABSORPTION REFRIGERATION SYSTEM

BACKGROUND OF THE INVENTION

1. Field of the Invention

The present invention relates to an absorption refrigeration system using refrigerant and absorbent and, more particularly, to an improved absorption refrigeration system providing a receiver for receiving absorbent solution from a rectifier which is disposed below the rectifier and communicates with the lower portion of a generator through a passage means for directing the absorbent to the generator.

2. Description of the Prior Art

Some absorption cooling and heating system use water as the medium of refrigerant compositions such as water-lithium halide or ammonia-water. It is known that organic compounds, such as halogenated methane-dimethyl formamide and halogenated methane-furan, have been used as the refrigerant compositions. However, the construction of conventional absorption type cooling and heating machines as exemplified by U.S. Pat. No. 4,127,993 has a problem that the organic absorbent contained in the refrigerant composition tends to be decomposed by local overheating at the heater in a generator, whereby the performance of the solution is lowered. Further, the absorbent solution necessarily drops from the rectifier onto the liquid in the generator, thus hindering evaporation of the refrigerant in the generator. Furthermore, the prior art absorption type cooling and heating machines do not necessarily have a satisfactory thermal efficiency, because the heat source of the heater in the generator is used simply for heating the aforementioned solution.

SUMMARY OF THE INVENTION

The present invention is directed to providing an absorption refrigeration system having a generator, a rectifier, a condenser, an evaporator, an absorber and heat exchangers which are connected by means of conduit in an airtight manner so that circulations for refrigerant and for absorbent are formed, wherein the rectifier is mounted upright, above the generator, and wherein a receiver for receiving absorbent solution is mounted below the rectifier and communicates with the lower portion of the generator through an absorbent solution passage means, whereby decreasing hindrance of the generation of refrigerant vapor from the generator, thus increasing the efficiency in generating refrigerant vapor and, at the same time, preventing local overheating of absorbent solution in the generator.

In one aspect of the invention, the condenser is disposed at the upper portion of the rectifier and the absorber is disposed at the lower portion of the rectifier such that these two components surround the rectifier.

DESCRIPTION OF THE PREFERRED EMBODIMENTS

Figure 1:
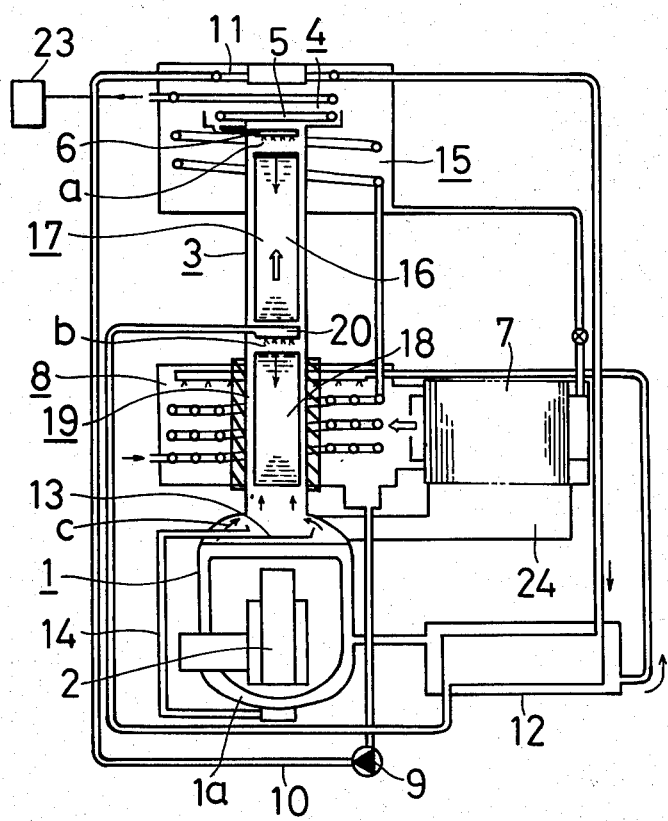
FIG. 1 is a longitudinal cross section of one example of absorption refrigeration system according to the present invention.

The preferred embodiments of the present invention will be hereinafter described with reference to the accompanying drawings. Referring first to FIG. 1, there is shown the general construction of an absorption refrigeration system which is used as a heat pump for circulating refrigerant and absorbent. A generator 1 has a heater 2, such as a kerosene or gas burner, and acts to heat and boil weak solution to obtain gasified refrigerant. The term "weak solution" refers to an absorbent solution which contains more refrigerant and is weak in absorbent power. A rectifier 3 separates gaseous absorbent from the gaseous refrigerant moving upward, which is then passed to a heat exchanger 5 for partly condensing it. Then, the final separation of the absorbent component is effected by a reflux zone 4. The resultant liquid is directed to a liquid distributor 6 so that it is discharged from the top of the rectifier 3. Thus, the liquid is used as a vapor-liquid contacting liquid which separates the absorbent components from the refrigerant. The system further includes an air heat exchanger 7 which operates as an evaporator during the cooling cycle and as a heater during the heating cycle, and an absorber 8 in which strong solution is sprayed for the removal of the refrigerant in the heat exchanger 7. The term "strong solution" refers to an absorbent solution which contains less refrigerant and is strong in absorbent power. Thus, refrigerant gasified by the evaporator 7 is absorbed, thus allowing the evaporator 7 to absorb heat continuously from a heat source of a lower temperature, such as the outside air therefor. An absorbent pump 9 installed in a weak solution conduit 10 causes the weak solution, that is, absorbent which has absorbed refrigerant in the absorber 8, to flow back to the generator 1. Further installed in the conduit 10 are a heat exchanger 11 for cooling the inside of the reflux zone 4 and a heat exchanger 12 for preheating the weak solution in heat exchange relation with the strong solution that is directed from the generator 1 to the absorber 8.

In the generator 1, the bottom of the rectifier 3 is provided with an opening, and a platelike absorbent solution receiver 13 extends horizontally below the rectifier 3. The receiver 13 is provided with an upper opening, which is disposed in opposition to the opening of the rectifier. To ensure that solution falling from the rectifier 3 is received, the upper opening of the receiver is made greater than the bottom opening of the rectifier 3. The receiver 13 is communicated with the bottom of the generator 1 by means of a conduit 14.

The rectifier 3 has a rectifying portion 17 filled with packing material 16, which brings liquid sprayed by the distributor 6 into contact with the gas stream flowing from the generator 1 toward the condenser 15. The rectifier 3 also has a cylindrical analyzing portion 19 filled with packing material 18, which also acts to bring the gas steam into contact with the weak solution. Both portions 17 and 19 are placed upright. The liquid passed through the packing material 16 in the rectifying portion 17 and the weak solution, that was discharged over the packing material 18 by the distributor 20 and passed through it, flow through the analyzing portion 19 downward and return to the generator 1.

Figure 2:
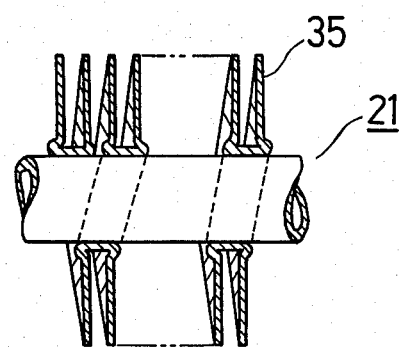
FIG. 2 is a side elevation including a partial section of a heat exchanger used in the system of FIG. 1.

The aforementioned absorber 8 and condenser 15 hold heat exchangers 21 and 22, respectively, therein. Each heat exchanger consists of a piping around which a coiled segment fin 35 is installed, as shown in FIG. 2, and either is coiled about the rectifier 3. Thus, when water or brine flows through the heat exchanger 21 or 22, heat is supplied from the absorber 8 or condenser 15 to a load 23 in heating operation mode. The heat exchanger 5 composed of a continuous coil cooperates with the cooling action of the reflux zone 4 to further elevate the temperature level of the fluid supplied to the load 23. A duct 24 for guiding exhaust gas generated by combustion in the heater 2 extends into the exchanger 7, and therefore the waste heat derived by the operation of the heat pump can be recovered by the exchanger 7 for supply to the load 23.

In the absorption refrigeration system constructed as described hereinbefore the absorber is so disposed that it surrounds the exchanger portion of the rectifier which has high temperature level next to the generator and, consequently, energy loss due to heat dissipation from the high temperature rectifier is small. Similarly, the condenser surrounding the upper portion of the rectifier acts to recover heat. Thus, leak of heat is effectively reduced and, accordingly, the heat pump which serves to supply heat is improved in running efficiency. The result is that the surface area of the machine per unit capacity of refrigeration can be reduced.

Also, the absorber and the condenser surround the rectifier as coiled heat exchangers and, consequently, a long piping can be used as a heat exchanger as it is, thus in contrast with the conventional construction where short pipings are welded together to form a heat exchanger. In this means, the novel machine allows a substantial decrease in welding spots and simplification of the processes when manufactured and, at the same time, it requires less airtight weldings and narrower occupying space. Further, the independent location of the rectifier imposes no restrictions upon the arrangements of the other heat exchangers. As such, the novel system is well suited to fabrication employing automatic welding or automatic assembling machines.

The operation of the generator and the succeeding rectifier which constitute the principal portions of the invention is hereinafter described in detail.

First, reflux (a) obtained by condensation and separation by the reflux zone 4 passes through the distributor 6 and then flows down within the rectifying portion 17 filled with the packing material 16. On the other hand, solution (b), which absorb refrigerant in the absorber 8 to be weak solution, is admitted into a heat exchanger 12 and moistened, and then it is discharged over the analyzing portion 19 filled with the packing amterial 18 from the distributor 20 having small holes, of course, to meet refrigerant (c) evaporated in the generator 1.

The solution (b) falling from the analyzing portion 19 of the rectifier 3 is received in the receiver 13 located just below the analyzing portion 19. The solution (b) collected in the receiver 13 is guided to the bottom or lower portion (1a) of the generator 1 through the conduit, pipe, path to the generator or other passage means 14, and thereafter it is warmed by a heat conducting tube to generate refrigerant vapor. Thus, the refrigerant vapor moves upward in the showering of the solution, and therefore the vapor generates freely from the surface of the liquid without experiencing and resistance and moves toward the analyzing portion 19 located above. On the other hand, the liquid, which has become strong after the refrigerant is generated from it, is guided from its surface level toward the heat exchanger 12.

Figure 3:
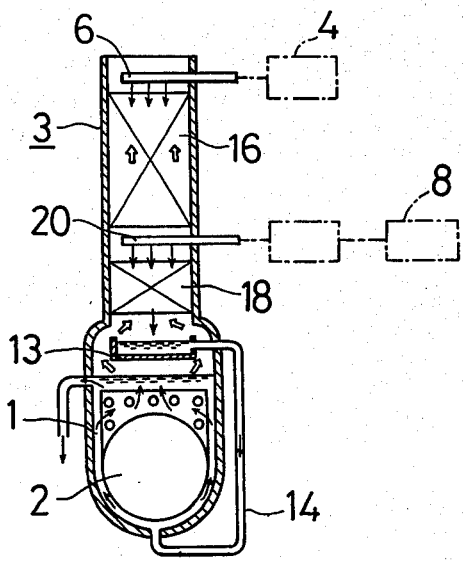
FIG. 3 is a fragmentary longitudinal cross section of another example of absorption refrigeration system according to the invention.
Figure 4:
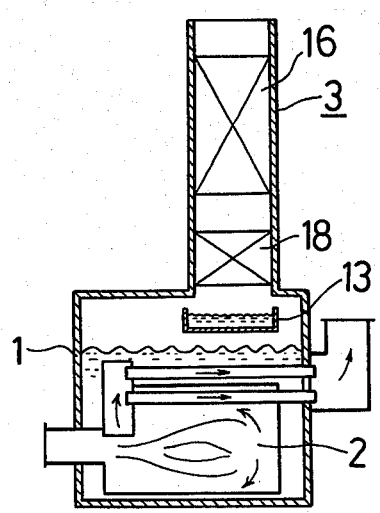
FIG. 4 is another fragmentary longitudinal cross section of the system shown in FIG. 3.

Referring now to FIGS. 3 and 4, there is shown another example of the invention which is similar to the above example except that absorber 8 and a condenser (not shown) are located at a short distance from rectifier 3.

Figure 5:
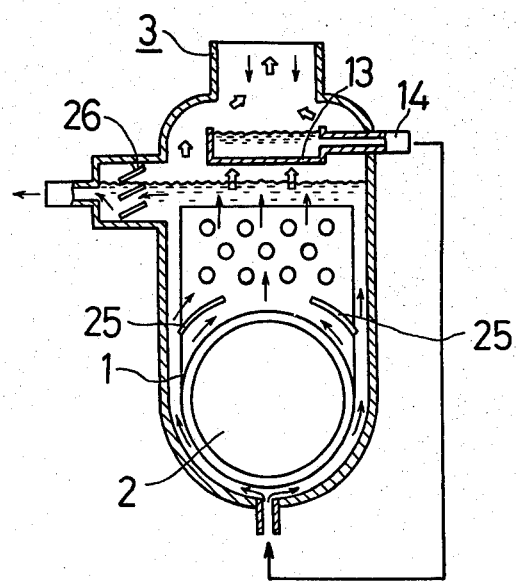
FIG. 5 is a fragmentary longitudinal cross section of a still other example of the invention.

Referring to FIG. 5, there is shown still another example of generator. There provided with baffles 25 for preventing local overheating in the upper portion thereof. The generator has an exit portion on its side wall and this exit portion is provided with baffles 26 so as not to withdraw in refrigerant vapor. In this case, solution flows between the heater 2 constituting the inner wall and the cylindrical outer wall, and baffles 25 increases, the velocity of the flow of solution, thus local overheating of absorbent soulution is avoided.

Figure 6:
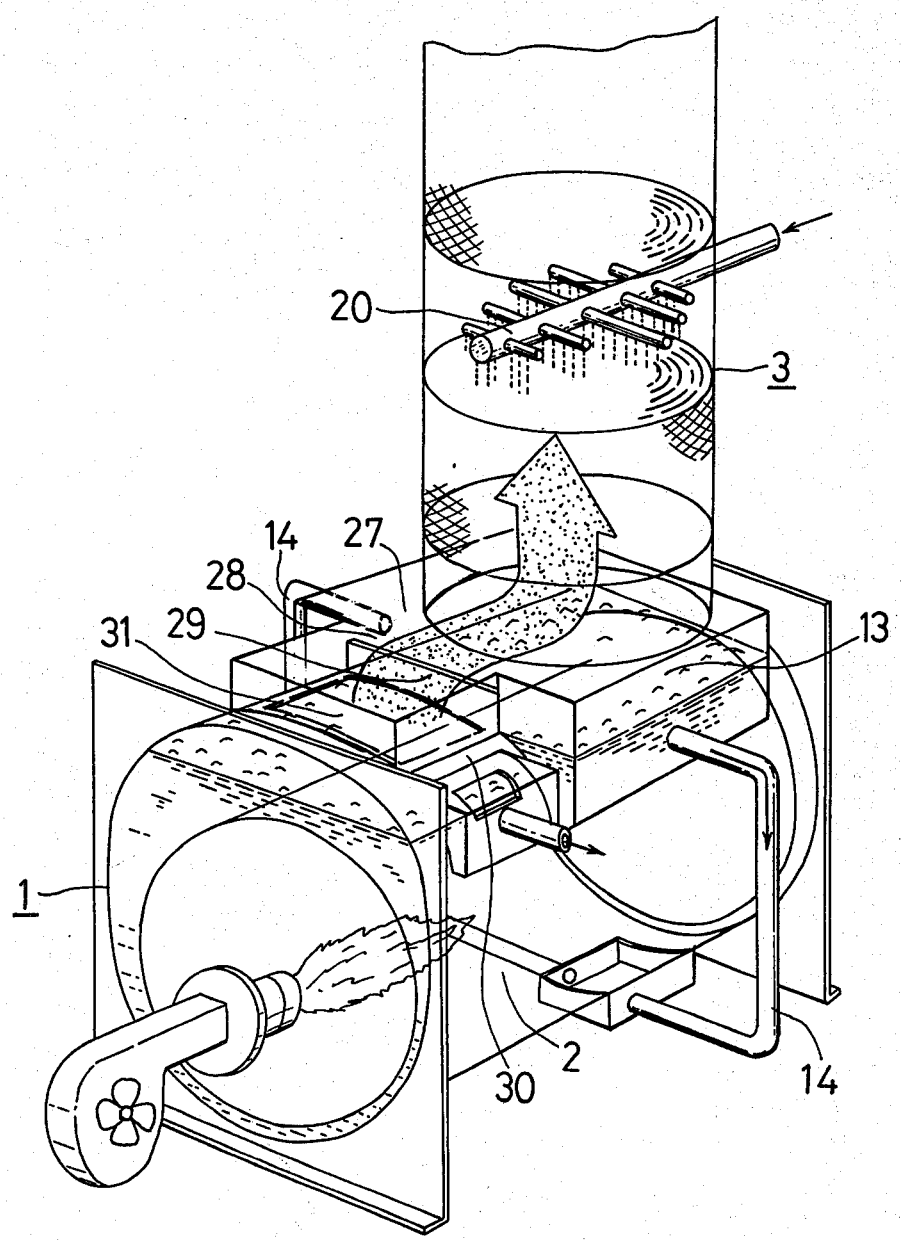
FIG. 6 is a perspective view of a further example of the invention with a generator and a rectifier and neighboring parts shown to illustrate the functions thereof.
Figure 7:
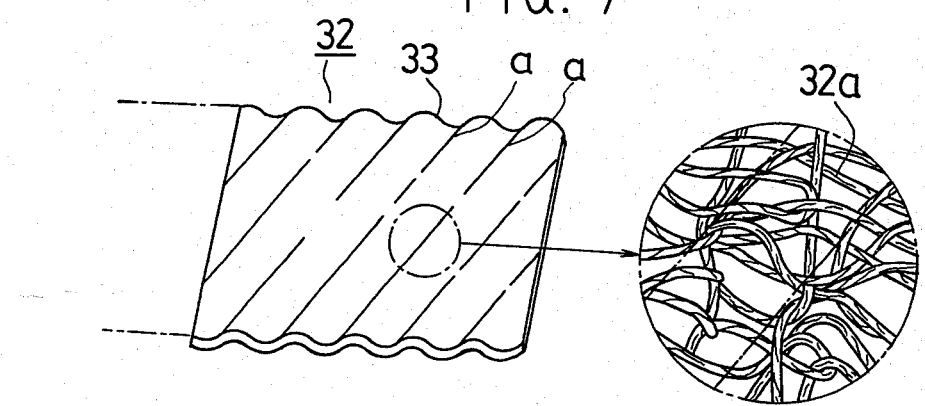
FIG. 7 shows a perspective view of a netty sheet constituting a packing material element used in the invention on its left side and a partially enlarged plan view of the sheet on its right side.
Figure 8:
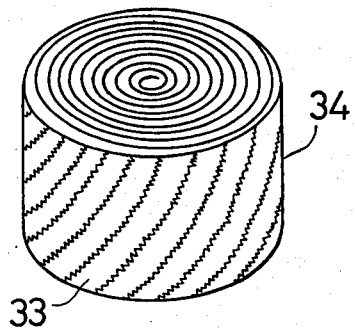
FIG. 8 is a perspective view of the packing material element of FIG. 7.
Figure 10:
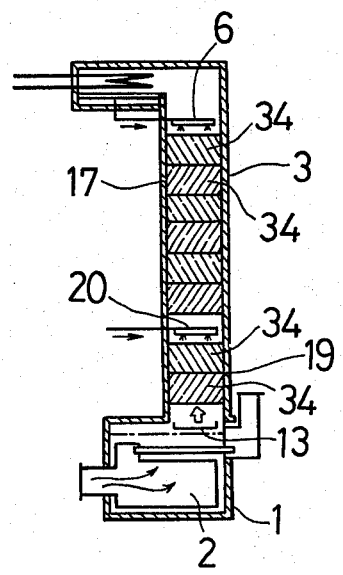
FIG. 10 is a longitudinal cross section of the rectifier for illustrating the manner in which the packing material elements are used in the rectifier.
Figure 9:
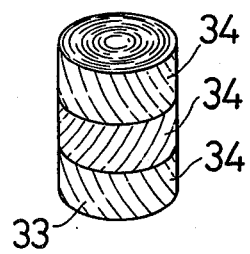
FIG. 9 is a perspective view of the stacked packing material elements.

Referring to FIG. 6, there is shown a further example of the invention. A gaseous refrigerant guiding part 27 shaped into a rectangular flat box is provided between generator 1 and rectifier 3 and holds the receiver 13. The guiding part 27 includes a partition wall 29 which has air vents 28 at the upper portion. A portion of the guiding part 27, and partition wall 29 constitutes the receiver 13. The bottom of the receiver 13 is provided by the domelike upper wall 30 of the generator 1. The exits for the solution are disposed on the side wall of the receiver 13 and are connected to two passages 14 which are located in a low position on opposite sides to prevent the absorbent from stagnating. As indicated by an arrow, vapor generated from the generator 1 passes through an opening 31 which is formed in the upper wall 30 of the generator 1, and then it passes through the air vents 28 and enters the space above the receiver 13 from one side thereof. Then, the vapor moves upward into the rectifier 3. This construction is practical, because conventionally used rectifier and generator can be employed without the necessity of making great alterations to them.

Referring next to FIGS. 7-10, the aforementioned packing materials 16 and 18 used in the rectifying portion 17 and the analyzing portion 19, respectively, of the rectifier 3 are described in detail. A corrugated netty sheet 32 is fabricated by weaving thin metallic fibers 32a as of stainless steel or aluminum and has a constant width. The ridgelines (a) of the corrugations 33 are inclined at a given angle with respect to the flow direction of vapor and liquid. This angle is preferably on the order of 30°-60°. It has been found experimetally that when the rectification effect is great, the angle is preferably 45°. This netty sheet 32 is rolled and becomes a cylindrical packing material element 34. These packing material elements 34 are stacked on top of each other within the cylindrical rectifier 3 such that the directions of their corrugations alternate with each other. The upper portion of the rectifier 3 is used as the rectifying portion 17, while the lower portion is used as the analyzing portion 19. The distributor 6 which is in communication with the reflux zone 4 is disposed above the rectifying portion 17. The distributor 20 formed with small holes for spraying solution is installed above the analyzing portion 19. The height of each packing material element 34 is preferably one-half the diameter of the rectifier 3.

In the operation of this construction, reflux issuing from the reflux zone 4 is uniformly sprayed over the packing elements 34 from the distributor 6. In the analyzing portion disposed below this rectifying portion, absorbent is sprayed over the packing elements 34 from the distributor 20. Meanwhile, the generator 1 disposed in the lowest position allows gaseous refrigerant to generate from the absorbent solution due to the action of the heater 2, and it moves upward. Then, it passes through the packing material elements 34 upward in the analyzing portion 19 and rectifying portion 17 against the down flow of weak solution and the reflux. Because the packing material elements are corrugated (33) and rolled, and because the corrugation directions of the stacked elements alternate with each other, the gas moves upward uniformly without causing blow-by.

The improved packing material elements each made of a rolled corrugated netty sheet of metallic fiber allow partition of the rectifier shaped like a tower into upper and lower portions, thus forming the analyzing and rectifying portions, respectively. Consequently, the construction can be made compact. Of course, as these packing material elements are stacked on top of each other so that their corrugation directions alternate with each other, blow-by is prevented. Further, the packing material consists of individual elements and these elements have the same shape that has been fabricated by rolling a netty sheet, and therefore uniform packing of the elements can be effected in assembling the rectifier, whereby consistent products are assured. Thus, the novel packing material is practical in that they are well adapted to mass production.

Refrigerant and absorbent are not particularly limited in this invention. It has been found, however, that trifluoroethanol, abbreviated TFE, is desirable for the refrigerant, and that N-methyl-2-pyrolidone, abbreviated MP, N-ethyl-2-pyrolidone, N-propyl-2-pyrolidone and N-butyl-2-pyrolidone are desirable for the absorbent.

When the novel refrigeration system is run under the conditions that (i) TFE is used as the refrigerant and MP is used as the absorbent, (ii) the strong solution supplied to the absorber contains 21% TFE, and (iii) after absorption of the refrigerant the weak solution contains 52% TFE, heat source water of about 25° C. can be heated close to 60° C. and supplied to a high temperature load and, at the same time, cold water returning to the evaporator at the temperature of 12° C. can be cooled to about 7° C. and supplied to a cooling load. Thus, cold water and heat water can be simultaneously supplied.

When this system is run under the conditions that (i) the strong solution supplied to the absorber contains 21% TFE and that (ii) after absorption of the refrigerant the weak solution contains 47% TFE, if brine flowing into the evaporator is used as a heat source, then water of 5° C. can be heated to about 55° C. and supplied to the heating load, while brine returning to the evaporator at the temperature of −3° C. can be cooled close to −8° C. and supplied to the cooling load. Thus, supply of hot water and supply of brine used for making ice can be simultaneously done.

In applications as described above, the efficiency at which the primary energy is used reaches more than 120% when the cold load is not used and about 160% when it is used. When the novel absorption heat pump using fluorinated alcohol as its refrigerant and using alkylated pyrolidone as its absorbent is run under normal conditions, it does not experience freezing of the refrigerant and crystallization or solidification of the absorbent which were encountered in prior art absorption refrigeration machines. In this way, the novel system can supply energy to cooling and heating loads in wide range of temperatures from ice making to boiled water and can enjoy wide application, thus increasing the practicality.

What is claimed is:

1. In an absorption refrigeration system having a generator, a rectifier, a condenser, an evaporator, an absorber and heat exchangers which are connected by means of conduits in an airtight manner so that a circulating path for refrigerant and absorbent solution is formed,
the improvement wherein the rectifier is mounted upright above the generator, said generator having an upper and lower portion and containing a liquid surface in its upper portion; the liquid receiver for receiving absorbent containing refrigerant being mounted below the rectifier and above the liquid surface in the generator, the receiver communicating with the lower portion of the generator through a liquid passage means, the liquid passage means bypassing the liquid surface in the generator.

2. An absorption refrigeration system of claim 1, wherein the liquid receiver is disposed in opposition to an opening at the lower end of the rectifier and is provided with an opening greater than the opening at the lower end of the rectifier.

3. An absorption refrigeration system of claim 1, wherein a guiding part for guiding refrigernat gas generated from the generator is provided between the generator and the rectifier and the liquid receiver is set in said quiding part.

4. An absorption refrigeration system of claim 3, wherein the bottom of the liquid receiver is formed by the upper surface wall of the generator.

5. An absorption refrigeration system of claim 4, wherein the upper surface wall of the generator is shaped like a dome.

6. An absorption refrigeration system of claim 5, wherein the exists of the liquid passages which extend to the lower portion of the generator are disposed at the bottom portion of the liquid receiver in a low position on both sides thereof.

7. An absorption refrigeration system of claim 1, wherein the rectifier incorporates rolled packing materials made of corrugated netty sheets consisting of metallic fibers.

8. An absorption refrigeration system of claim 7, wherein the rolled packing materials are formed by a plurality of the corrugated netty sheets in such manner that, in the rolled state, the direction of the corrugation in each of the sheets is inclined at a given angle and is different with each other.

9. An absorption refrigeration system of claim 1, wherein the condenser is disposed at the upper portion of the rectifier and the absorber is disposed at the lower portion of the rectifier such that these two components surround the rectifier.

10. An absorption refrigeration system of claim 9, wherein the heat exchangers used in the condenser and the absorber each consist of a pipe with coiled segment fins which surrounds the rectifier.

11. An absorption refrigeration system of claim 1, wherein the evaporator is an air heat exchanger type evaporator.

12. An absorption refrigeration of claim 1, wherein the refrigerant and the absorbent are organic compounds.

13. An absorption refrigeration system of claim 1, wherein the refrigerant is fluorinated alcohol and the absorbent is alkylated pyrolidone.

* * * * *